United States Patent [19]
Boomgaard

[11] Patent Number: 4,903,006
[45] Date of Patent: Feb. 20, 1990

[54] POWER LINE COMMUNICATION SYSTEM
[75] Inventor: Dirk J. Boomgaard, Monroeville, Pa.
[73] Assignee: Thermo King Corporation, Minneapolis, Minn.
[21] Appl. No.: 311,502
[22] Filed: Feb. 16, 1989
[51] Int. Cl.$^4$ .................................... H04M 11/04
[52] U.S. Cl. ............................ 340/310 A; 333/177
[58] Field of Search ............ 340/310 A, 310 R, 825.5; 370/85; 333/167, 177

[56] References Cited
U.S. PATENT DOCUMENTS

| 4,065,763 | 12/1977 | Whyte et al. | 340/310 R |
| 4,668,934 | 12/1987 | Shuey | 340/310 A |
| 4,686,382 | 8/1987 | Shuey | 340/310 R |

Primary Examiner—Joseph A. Orsino
Assistant Examiner—Frank M. Scutch, III

[57] ABSTRACT

A power line communication system which includes an electrical power line having one or more loads which feed objectionable electrical noise back into the power line. The electrical noise is attenuated across a broad frequency range to enable effective communication over the power line by a directional common mode trap located between the point where the communication signals are applied to the power line and the source of the electrical noise. The trap requires only a capacitor for each electrical phase and a 1:1 transformer having a magnetic core and single turn, straight through windings. The trap is connected to provide a low impedance path to ground for the electrical noise, while providing a high impedance to ground for the communication signals.

7 Claims, 3 Drawing Sheets

POWER LINE COMMUNICATION SYSTEM

TECHNICAL FIELD

The invention relates in general to communication systems, and more specifically to communication systems which utilize an electrical power line for conveying communication signals.

BACKGROUND ART

In certain types of applications requiring the transmission and reception of communication signals, it is convenient to utilize the conductors of an electrical power system to convey the signals. For example, co-pending application Ser. No. 189,895, filed May 3, 1989, entitled "Power Line Carrier Communication System", which is assigned to the same assignee as the present application, discloses the use of electrical power lines for monitoring refrigerated containers, caller "reefers", on board ships and in ship terminals.

It has been found that when certain types of electrical loads are energized by an electrical power line, such as solid state motor drives which chop the AC wave form, that such loads feed back electrical noise into the electrical power line, making it difficult to communicate over the power line with practical signal levels.

Since electrical noise covers a broad frequency range, it is not practical to use tuned filters, as a large number of large filters, which are difficult to tune, would be required.

SUMMARY OF THE INVENTION

Briefly, the present invention is a power line communication system which includes a broad band directional trap connected to the power line near the noise source, between the noise source and the point where communication signals are applied to the power line. The trap is easily constructed and installed on a power line, requiring only one capacitor per electrical phase and a 1:1 transformer having one more winding than the number of electrical phases. A single-phase power line would thus require only one capacitor, which is connected to the conductor which is not grounded, and a three-phase power line would require three capacitors, one connected to each phase conductor. The transformer is easily constructed, requiring only a magnetic core having a window through which single-turn, straight through windings proceed. The windings are thus formed by directing each phase conductor through the core window, and by directing an additional conductor through the core window which functions as a capacitor common, interconnecting each phase capacitor to ground. The connection of each capacitor to a power line conductor is made at a point located between the transformer and the point where the communication signals are applied to the power line. Thus, electrical noise proceeds from the noise source through the phase associated transformer winding or windings and then the noise encounters the capacitor or capacitors. The capacitor or capacitors, along with the transformer winding connected to the capacitor or capacitors, provides a low impedance path to ground for the electrical noise, as the capacitor or capacitors direct the electrical noise back through the transformer in an opposite sense to the electrical noise in the other windings, providing an inductance close to zero. On the other hand, the communication signals approach the trap from the opposite direction, and thus the communication signals must flow through all of the transformer windings, including the capacitor related winding, in the same direction. This presents a high inductance to the communication signals, and a high impedance to ground.

BRIEF DESCRIPTION OF THE DRAWINGS

The invention will become more apparent by reading the following, detailed description in conjunction with the drawings, which are shown by way of example only, wherein.

DESCRIPTION OF PREFERRED EMBODIMENTS

Figure 1:
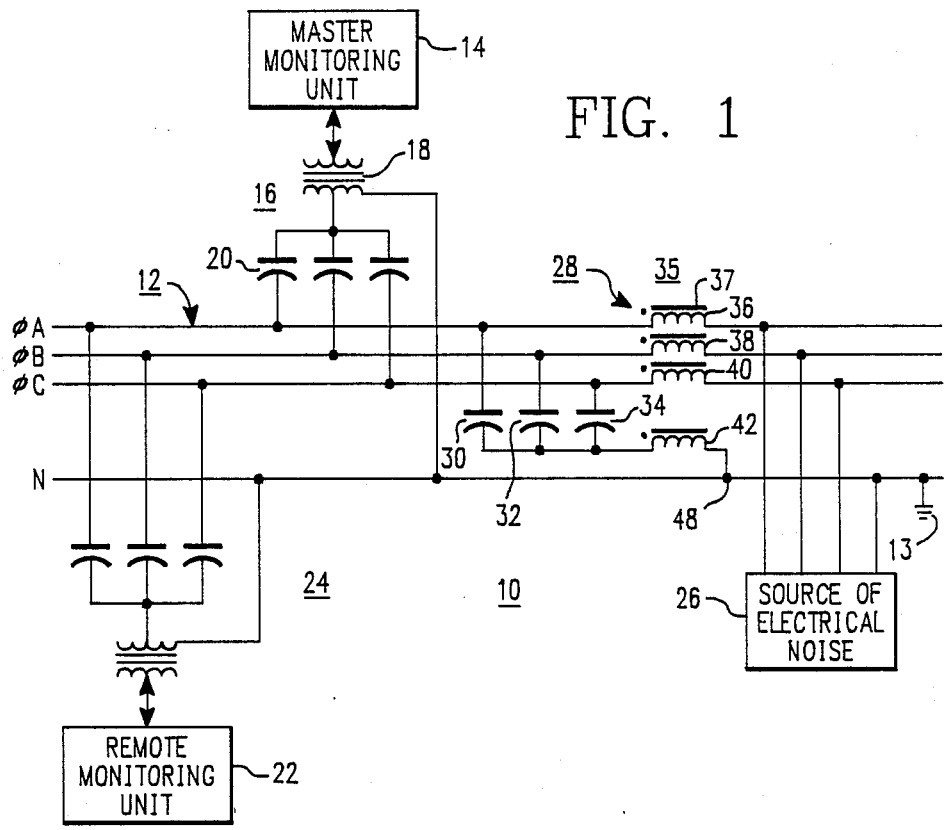
FIG. 1 is a partially schematic and partially block diagram of a three-phase electrical power line communication system constructed according to the teachings of the invention.

Referring now to the drawings, there is shown a partially schematic and partially block diagram of a power line carrier communication system 10 constructed according to the teachings of the invention. System 10 includes a three-phase electrical power line 12, such as an electrical distribution system on board a ship, or an electrical distribution system in a ship terminal, for example, having phase conductors A, B and C, and a ground 13, such as a grounded neutral N, or a ships hull. A master monitoring unit 14 applies a modulated radio frequency carrier to power line 12 in a common mode, i.e., directly to each phase, via power line coupling apparatus 16, such as a transformer 18 and coupling capacitors 20. A remote monitoring unit 22, such as may be associated with a reefer, receives the modulated signal via power line coupling apparatus 24. The remote monitoring unit 22 prepares the requested data and transmits the data back to the master monitoring unit 14 via modulated carrier applied to the power line. A source 26 of electrical noise connected to power line 12 can seriously degrade the performance of the power line communication apparatus, if the noise is not isolated from the power line used for communication. The present invention isolates the electrical noise via a broadband common mode trap 28 which requires no tuning.

More specifically, trap 28 includes a power frequency blocking capacitor for each phase, such as capacitors 30, 32 and 34 connected to phases A, B and C, respectively, and a 1:1 transformer 35. Transformer 35 has a magnetic core 37, a winding for each electrical phase, such as windings 36, 38 and 40 for phases A, B and C, respectively, and a winding 42 which functions as a capacitor common. Windings 36, 38 and 40 are connected in series with phase conductors A, B and C, respectively, and winding 42 connects the remaining ends of capacitors 30, 32 and 34 to ground, e.g., to the grounded neutral conductor N.

Figure 2:
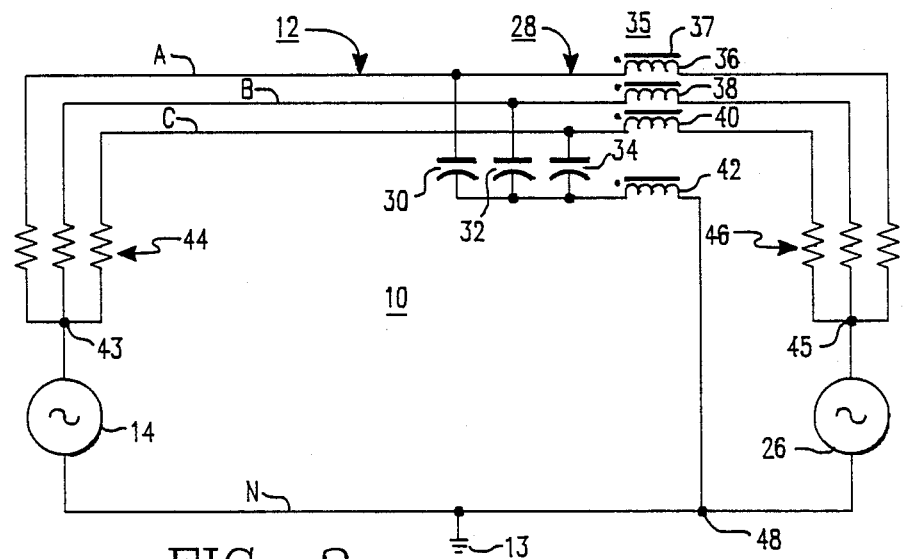
FIG. 2 is an equivalent circuit diagram of the three-phase system shown in FIG. 1.

FIG. 2 is an equivalent schematic diagram of the power line carrier communication system 10 with a generator of radio frequency carrier, such as the master monitoring unit 14, applying the carrier to power line 12 at a point 43 in a common mode, with resistors 44 indicating the impedance of the power line 12. Also connected to power line 12 at a point 45 is the noise generator 26, with resistors 46 indicating the output impedance of the noise generator.

Looking at the power line 12 from the side of the noise generator 26, the electrical noise passes through the transformer windings 36, 38 and 40, entering the un-dotted ends of the windings. The impedances of capacitors 30, 32 and 34, while high to power frequency currents, are low across the broad spectrum of high frequencies present in electrical noise. The impedances of capacitors 30, 32 and 34 to electrical noise are also low compared with the impedance 44 of the power line. The electrical noise thus flows through capacitors 30, 32 and 34 and enters the dotted end of winding 42. The electrical noise through winding 42, being in the opposite sense to the electrical noise flowing into the un-dotted ends of windings 36, 38 and 40, makes transformer 35 function as a bifilar wound coil, reducing the inductance of transformer 35 to the flow of the electrical noise to near zero. Thus, capacitors 30, 32 and 34 along with winding 42 provide a very low impedance path to ground for the electrical noise. The connection 48 to ground should be made near the noise generator so that there is very little impedance in the ground path back to the noise generator 26, precluding pumping the noise back into the power line 12.

Looking at the power line 12 from the side of the radio frequency generator 14, the communication signals all flow through transformer 35 in the same direction, i.e., into the dotted ends of windings 36, 38, 40 and 42, and thus transformer 35 presents a high inductance to the radio frequency signals, and a high impedance to ground.

Figure 3:
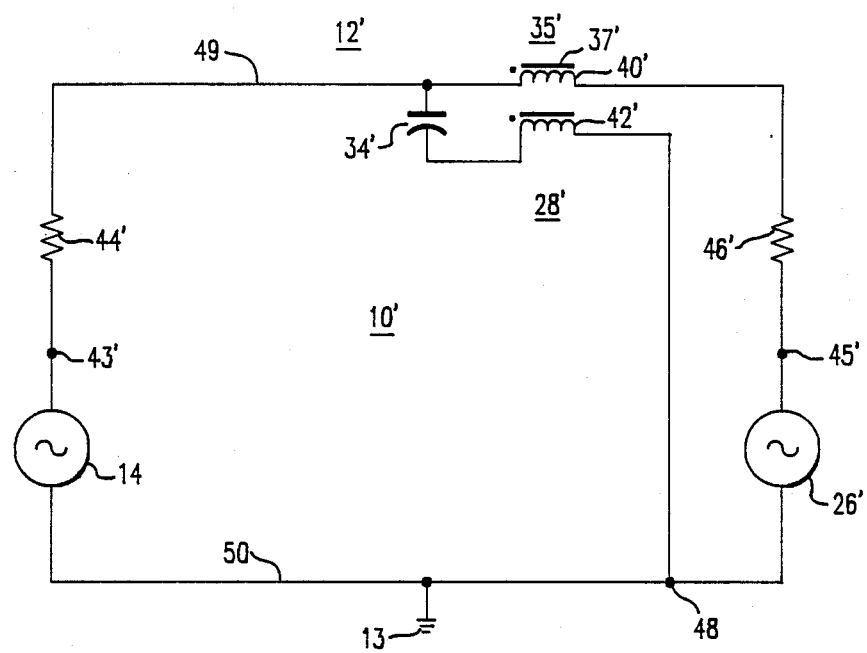
FIG. 3 is an equivalent circuit diagram of a single-phase power line communication system.

FIG. 3 is an equivalent circuit for a single-phase power line communication system 10' having first and second conductors 49 and 50, with conductor 50 being grounded at 13. Like reference numerals in FIGS. 2 and 3 except for a prime mark indicate elements of the single phase system 10' which are similar to the elements of the three-phase system 10. Transformer 35' carries the full load current in the single-phase embodiment of the invention, and thus the magnetic core 37 must be constructed to accommodate the power frequency current without saturating. In the instance of the three-phase system 10, transformer 35 only has to be constructed to accommodate the maximum unbalance expected, since the sum of the load currents at any instant is zero for a balanced load.

Figure 4:
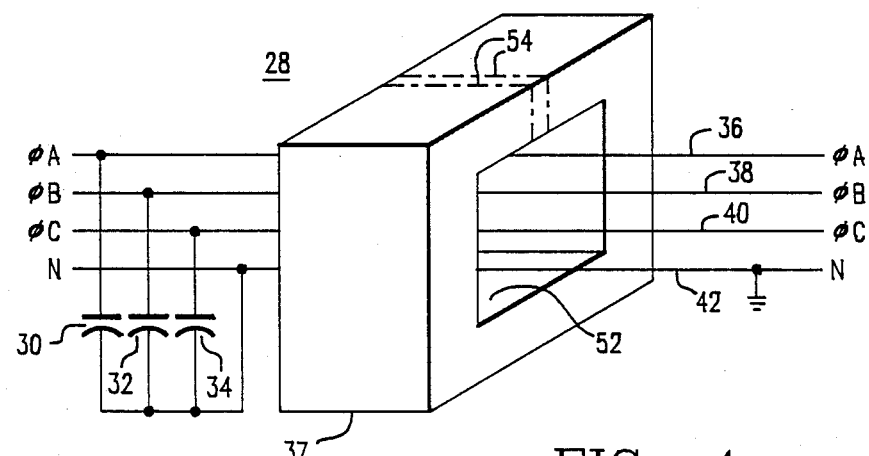
FIG. 4 is a schematic diagram of the trap shown in FIGS. 1 and 2, which more clearly illustrates the construction of a magnetic core used in the trap.

FIG. 4 illustrates an exemplary construction of the common mode trap 28 shown schematically in FIGS. 1 and 2. Magnetic core 37 may be constructed of ferrite to provide a window 52. For example, magnetic core 37 may be assembled from eight power U-cores, e.g., Carbon Stackpole #50-0462, or equivalent. The windings 36, 38, 40 and 42 are single turn, straight through conductors, i.e., the conductors of the phases may simply be directed through the core window 52. The capacitors may be 20 microfarad, 1000 volt capacitors, for example, such as SCR commutating capacitors, e.g., General Electric type 26F6770FC, or equivalent. The broken lines 54 indicate a non-magnetic gap, which may be used when magnetic core 37 is used in a angle-phase application, to prevent saturation at power load current frequency, e.g., 60 Hz.

Figure 5:
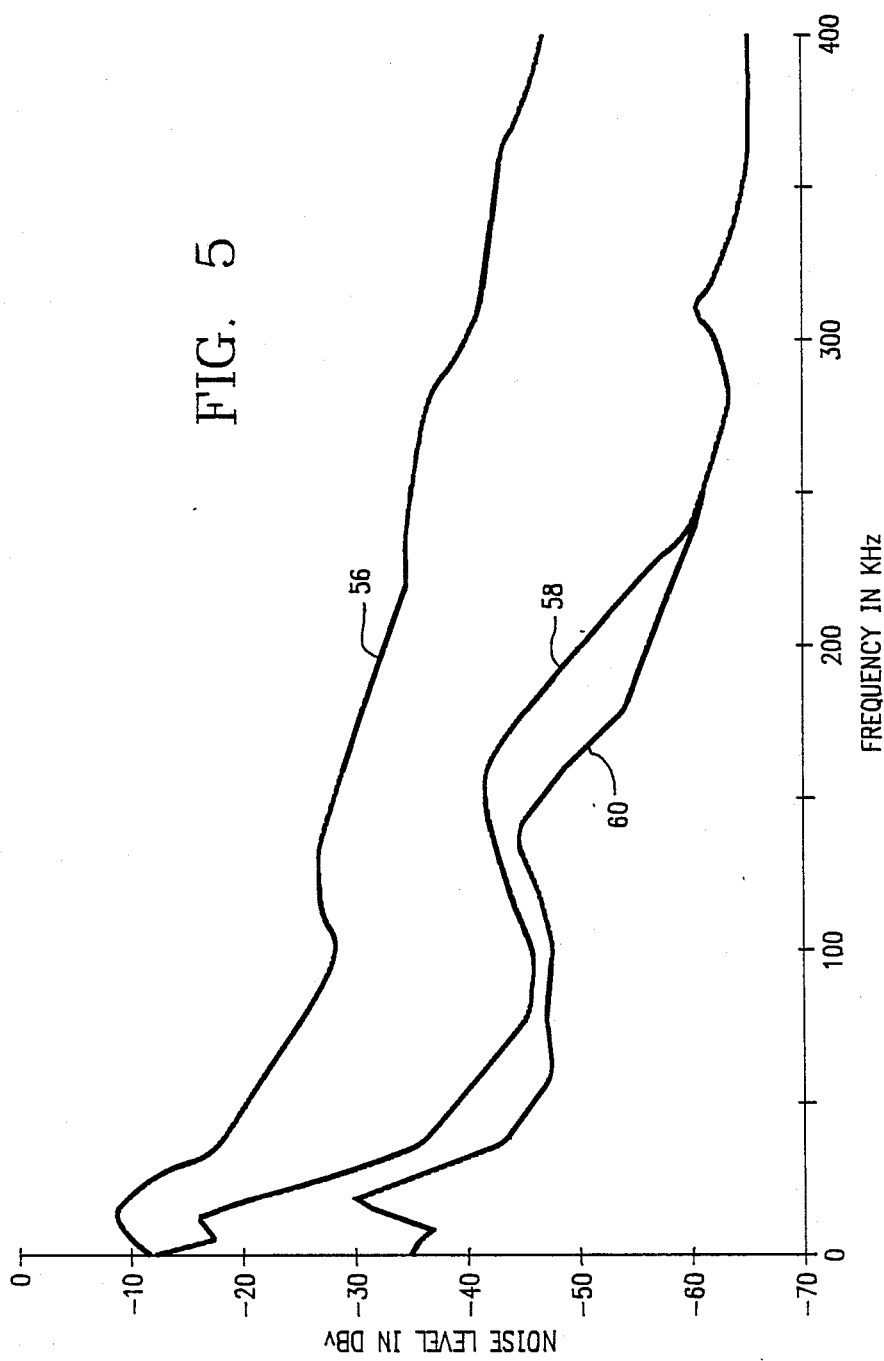
FIG. 5 is a graph which illustrates the effect of the trap on electrical noise generated by a three-phase, 440 volt, 300 HP variable frequency solid state motor drive operating from a ship's electrical system.

FIG. 5 is a graph which plots noise level in dBv versus frequency in kHz, illustrating the effectiveness of trap 28 across a wide frequency range in removing shipboard noise produced by a three-phase 440 volt, 300 HP variable frequency solid state motor drive. Curve 56 illustrates the electrical noise on the three-phase power line with the solid state motor drive operating, without the common mode trap 28. Curve 58 illustrates the electrical noise on the power line with the solid state motor drive operating, with the common mode trap 28 connected. It will be noted that there is about a 20 dB reduction across the frequency range which would most likely be used for power line carrier communications. Curve 60 illustrates the electrical noise on the power line with the solid state drive turned off, and without the common mode trap 28. Comparing curves 58 and 60 it will be noted that from about 40 kHz to 400 KHz the curves are very close to one another, indicating that the trap 28 removes substantially all of the electrical noise produced by the motor drive, enabling effective power line communications with normal signal levels.

It will be noted that in the three-phase embodiment two capacitors interconnect any two phases. Thus, it is important that the communication terminals be applied to the three phase conductors of a three-phase embodiment of the invention in a common mode, as opposed to a differential mode.

I claim:

1. A power line communication system comprising:
an electrical power line having a predetermined number of electrical phase conductors, and electrical ground,
a source of communication signals applied to said power line at a first point,
a load connected to said power line at a second point, said load applying electrical noise to said power line,
and a broad band directional trap connected to said power line between said first and second points which provides a lower impedance to ground for the electrical noise than for the communication signals,
said trap including a capacitor connected to each electrical phase conductor, and a 1:1 transformer having a winding connected in series with each electrical phase conductor between said first and second points, and an additional winding,
said additional winding functioning as a capacitor common, connecting each phase related capacitor to electrical ground,
each phase related capacitor being connected to the associated phase conductor between the associated phase related transformer winding and said first point, to cause communication signals to pass through all of the transformer windings in the same direction, providing a high inductance and high impedance to ground for the communication signals, while causing the electrical noise to pass through the capacitor common transformer winding in an opposite sense to the direction of the electrical noise through the phase related transformer windings, providing a low inductance and low impedance path to ground for the electrical noise.

2. The power line communication system of claim 1 wherein the transformer includes a magnetic core having a window, and the windings are single turn windings which pass straight through the window of said magnetic core.

3. A power line communication system comprising:
a single-phase electrical power line having first and second conductors, with the second conductor being connected to electrical ground,
a source of communication signals applied to said power line at a first point,
a load connected to said power line at a second point, said load applying electrical noise to said power line,
and a broad band, untuned directional trap connected to said power line between said first and second points which provides a lower impedance to ground for the electrical noise than for the communication signals,
said trap including a capacitor and a 1:1 transformer having first and second windings,
said first winding being connected in series with the first power line conductor between said first and second points,
said capacitor and second winding being serially connected from the first power line conductor to electrical ground, with the connection to the first power line conductor being between the first winding and said first point to cause communication signals to pass through the first and second windings in the same direction, providing a high inductance and high impedance to ground for the communication signals, while causing the electrical noise to pass through the windings in opposing directions, providing a low inductance and a low impedance path to ground for the electrical noise.

4. The power line communication system of claim 3 wherein the transformer includes a magnetic core having a window, and the first and second windings are single turn windings which pass straight through the window of said magnetic core.

5. The power line communication system of claim 4 wherein the magnetic core includes a non-magnetic gap to prevent power frequency saturation of the magnetic core.

6. A power line communication system comprising:
a grounded three-phase electrical power line having first, second and third conductors,
a source of communication signals applied to said power line at a first point,
a load connected to said power line at a second point, said load applying electrical noise to said power line,
and a broad band, untuned directional trap connected to said power line between said first and second points which provides a lower impedance to ground for the electrical noise than for the communication signals,
said trap including first, second and third capacitors and a 1:1 transformer having first, second, third and fourth windings,
said first, second and third windings being respectively connected in series with the first, second and third power line conductors between said first and second points,
said first, second and third capacitors being respectively connected from the first, second and third power line conductors to ground via said fourth winding, with the connections of the capacitors to the power line conductors being between the transformer windings and said first point, to cause communication signals to pass through the first, second, third and fourth windings in the same direction, providing a high inductance, while causing the electrical noise to pass through the fourth winding in a direction which opposes the direction of the noise through the first, second and third windings, providing a low inductance and a low impedance path to ground for the electrical noise.

7. The power line communication system of claim 6 wherein the transformer includes a magnetic core having a window, and the first, second, third and fourth windings are single turn windings which pass straight through the window of said magnetic core.

* * * * *